(12) United States Patent
Belmonte et al.

(10) Patent No.: US 7,849,396 B2
(45) Date of Patent: Dec. 7, 2010

(54) METHOD AND SYSTEM FOR DISPLAYING PRIORITIZATION OF METRIC VALUES

(75) Inventors: Michele Belmonte, Wappingers Falls, NY (US); David L. Carino, Sandy Hook, CT (US); Ann M. Johnson, Poughquag, NY (US); Joe Konsul, Athens, NY (US); David M. Mula, Wappingers Falls, NY (US); S. George Roumanis, Ossining, NY (US); Kathleen A. Schmidt, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 1563 days.

(21) Appl. No.: 11/007,986

(22) Filed: Dec. 9, 2004

(65) Prior Publication Data

US 2006/0095282 A1    May 4, 2006

Related U.S. Application Data

(60) Provisional application No. 60/624,066, filed on Oct. 29, 2004.

(51) Int. Cl.
*G06F 17/20* (2006.01)
(52) U.S. Cl. .................................................. 715/219
(58) Field of Classification Search .......... 715/212–220
See application file for complete search history.

(56) References Cited

U.S. PATENT DOCUMENTS

| | | | | |
|---|---|---|---|---|
| 5,701,400 A | * | 12/1997 | Amado | 706/45 |
| 5,918,238 A | * | 6/1999 | Hayashi | 715/223 |
| 5,963,910 A | * | 10/1999 | Ulwick | 705/7 |
| 6,085,165 A | * | 7/2000 | Ulwick | 705/7 |
| 6,115,691 A | * | 9/2000 | Ulwick | 705/7 |
| 6,578,004 B1 | * | 6/2003 | Cimral et al. | 705/7 |
| 6,643,613 B2 | * | 11/2003 | McGee et al. | 702/186 |
| 6,677,963 B1 | * | 1/2004 | Mani et al. | 715/764 |
| 6,789,046 B1 | * | 9/2004 | Murstein et al. | 702/182 |
| 6,915,270 B1 | * | 7/2005 | Young et al. | 705/10 |

(Continued)

FOREIGN PATENT DOCUMENTS

WO    WO0179994    10/2001

*Primary Examiner*—Doug Hutton
*Assistant Examiner*—Frank D Mills
(74) *Attorney, Agent, or Firm*—Jon A. Gibbons; Fleit Gibbons Gutman Bongini & Bianco PL

(57) ABSTRACT

A computing system, method, and computer program product display a plurality of metric values by forming a plurality of cells within a two-dimensional array and generating and displaying, within the plurality of cells, an indication of mutual importance for a set of metric values associated with two entities. The two entities are within one business entity or represent two business entities. The indication of mutual importance is selected from a fixed set of values of relative importance and indicated by one of a set of colors, a set of grey-scale tones, a set of backgrounds, a set of patterns, and a set of cell border styles. The method further identifies at least two metrics values in conflict, creates a diagram wherein conflicting metrics values are arranged in a circular manner, and indicates a relationship between conflicting metric values as a line with a steering direction indicated by an arrowhead.

25 Claims, 6 Drawing Sheets

U.S. PATENT DOCUMENTS

| | | | |
|---|---|---|---|
| 2001/0027455 A1* | 10/2001 | Abulleil et al. | 707/102 |
| 2002/0055864 A1* | 5/2002 | Cardwell et al. | 705/7 |
| 2002/0147726 A1* | 10/2002 | Yehia et al. | 707/101 |
| 2002/0184043 A1* | 12/2002 | Lavorgna et al. | 705/1 |
| 2002/0194218 A1* | 12/2002 | Klapper et al. | 707/503 |
| 2002/0198907 A1* | 12/2002 | Klapper et al. | 707/503 |
| 2003/0048265 A1* | 3/2003 | Bito et al. | 345/419 |
| 2003/0065479 A1* | 4/2003 | Kiser et al. | 702/182 |
| 2003/0065543 A1* | 4/2003 | Anderson | 705/7 |
| 2003/0110249 A1* | 6/2003 | Buus et al. | 709/224 |
| 2003/0144868 A1* | 7/2003 | MacIntyre et al. | 705/1 |
| 2003/0149682 A1* | 8/2003 | Earley et al. | 707/1 |
| 2003/0195780 A1* | 10/2003 | Arora et al. | 705/7 |
| 2003/0220926 A1* | 11/2003 | Huelsman et al. | 707/100 |
| 2004/0049729 A1* | 3/2004 | Penfield | 715/503 |
| 2004/0073467 A1* | 4/2004 | Heyns et al. | 705/7 |
| 2004/0078796 A1* | 4/2004 | Utsumi | 718/105 |
| 2004/0094616 A1* | 5/2004 | Girotto et al. | 235/378 |
| 2005/0071737 A1* | 3/2005 | Adendorff et al. | 715/500 |
| 2005/0144102 A1* | 6/2005 | Johnson | 705/35 |
| 2005/0288984 A1* | 12/2005 | Hamilton | 705/8 |
| 2006/0048044 A1* | 3/2006 | Genesereth et al. | 715/503 |
| 2006/0059063 A1* | 3/2006 | LaComb et al. | 705/35 |
| 2006/0080326 A1* | 4/2006 | Akbay et al. | 707/100 |
| 2006/0167704 A1* | 7/2006 | Nicholls et al. | 705/1 |

* cited by examiner

METHOD AND SYSTEM FOR DISPLAYING PRIORITIZATION OF METRIC VALUES

CROSS-REFERENCE TO RELATED APPLICATIONS

The present patent application is based upon a provisional patent application entitled, "Method and System for Strategic Profiling for Metric Prioritization," now U.S. Ser. No. 60/624,066, filed Oct. 29, 2004, the entire disclosure of which is incorporated by reference in its entirety.

BACKGROUND OF THE INVENTION

1. Field of the Invention

This invention generally relates to the field of computer based presentations, and more particularly relates to a system and method for displaying prioritization of metric values.

2. Description of Related Art

Within every business, as well as many facets of life in general, people strive to attain certain key goals and accomplishments. Many times in the corporate world, success or failure is measured by how well a group or individual performs against those key goals or metrics. However, companies or organizations within larger companies and entities are not islands unto themselves. Many companies, including most major corporations, contain a variety of internal organizations which may have different priorities, targets and goals, despite the fact that they share the same ultimate goal, namely the success of the company as a whole. In the ideal scenario, each entity's targets and goals should complement and support the targets and goals of other organizations. However, the probability of this ideal scenario decreases as an entity or company's size and complexity grow. Different entities' goals may begin to contradict or hinder other entities' goals. Worse yet, an entity's own internal goals or metrics may unknowingly contradict each other and/or provide incentive for the wrong employee actions. Additionally, metrics are often determined from the perception of how to best fulfill the needs of customers or clients, but in reality, meeting the chosen goals may actually contradict the needs or goals of the customer.

Unfortunately, there are no known specific solutions for this problem, other than trial and error or through numerous negotiations and meetings. It is very difficult to determine the interrelation of various goals and to present this information in a manner that consistently and readily conveys this relationship. Most often, metrics are simply listed in a column format with a ranking next to each one to indicate how the organization is performing against that particular standard. Any negative effect that succeeding in one category has upon a different metric is often unnoticed or ignored, making it a physical impossibility for a group to perform well on all selected measures.

Therefore a need exists to overcome the problems with the prior art as discussed above, and particularly for a method of displaying prioritization of metric values.

SUMMARY OF THE INVENTION

According to an exemplary embodiment of the present invention, a computing system, method, and computer program product display a plurality of different metric values by forming a plurality of cells within a two-dimensional array having a horizontal dimension and a vertical dimension, and generating, within the plurality of cells, an indication of mutual importance for a set of metric values, wherein the horizontal dimension is associated with the metric values of a first entity, and wherein the vertical dimension is associated with the metric values of a second entity. The method further displays the two-dimensional array with the indication of mutual importance therein.

The second entity and the first entity are within one business entity or represent two business entities. The indication of mutual importance for a set of metric values includes generating an indication of mutual importance selected from a fixed set of values of relative importance, wherein the fixed set of values of relative importance is indicated by one of a set of colors, a set of grey-scale tones, a set of backgrounds, a set of patterns, and a set of cell border styles. The metric values may represent procurement measurement analysis.

The method may further identify at least two metrics values in conflict, create a diagram wherein conflicting metrics values are arranged in a circular manner, and indicate a relationship between conflicting metric values as a line between the conflicting metric values, with a steering direction between the conflicting metric values indicated by an arrowhead.

According to another embodiment of the present invention, a computer system, method, and computer program product generate a plurality of different metric values by forming a plurality of cells within a two-dimensional array having a horizontal dimension and a vertical dimension, placing each of a first set of prioritized metrics from a first entity as a column label for each column along the horizontal dimension of the two-dimensional array, placing each of a second set of prioritized metrics from a first entity as a row label for each row along the vertical dimension of the two-dimensional array, and filling in the plurality of cells within the two-dimensional array with an indication of mutual importance for a given metric associated with a given column label in the first set of metrics and for a given metric value associated with a given row label in the second set of metric values.

The method further displays the two-dimensional array with the indication of mutual importance therein. The first set of prioritized metrics is the same or different than the second set of prioritized metrics.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DESCRIPTION OF THE PREFERRED EMBODIMENTS

Terminology Overview

Figure 1:
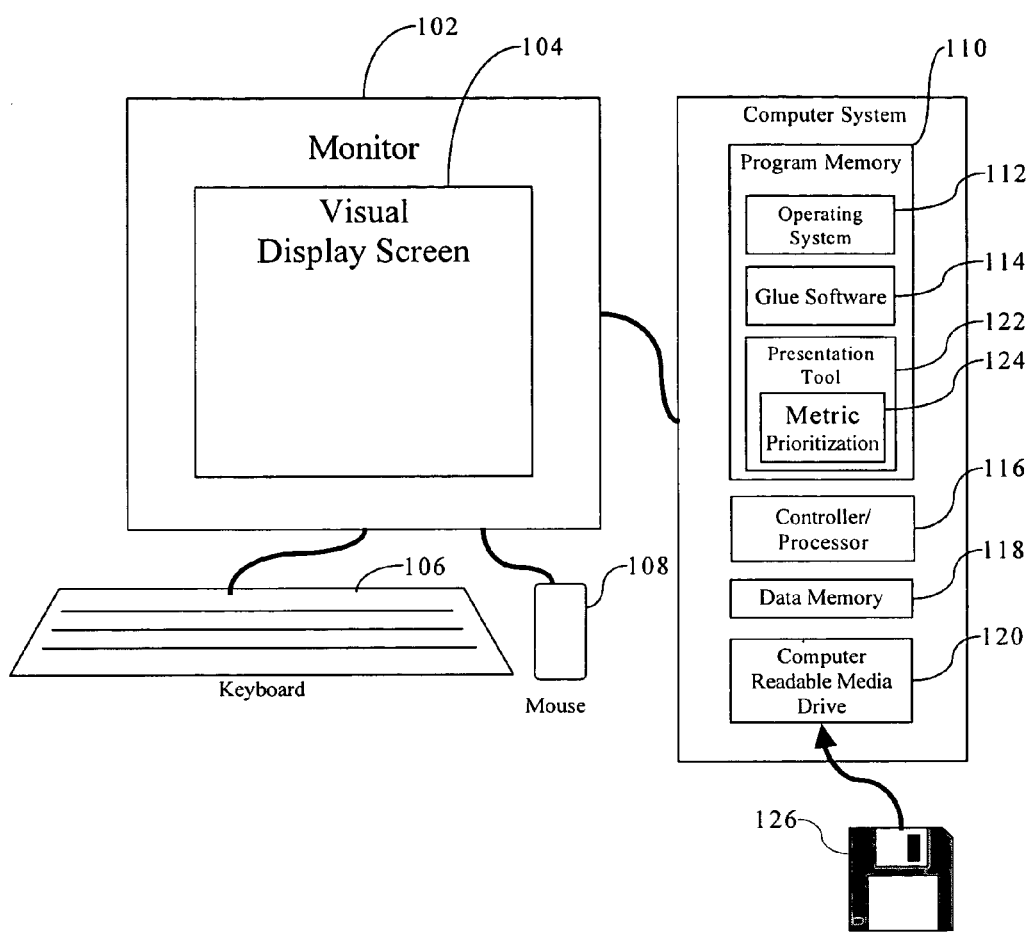
FIG. 1 is a block diagram illustrating a computer system for running software for displaying prioritization of metric values, in accordance with a preferred embodiment of the present invention.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an," as used herein, are defined as "one or more than one." The term "plurality," as used herein, is defined as "two or more than two." The term "another," as used herein, is defined as "at least a second or more." The terms "including" and/or "having," as used herein, are defined as "comprising" (i.e., open language). The term "coupled," as used herein, is defined as "connected, although not necessarily directly, and not necessarily mechanically." The terms "program," "software application," and the like as used herein, are defined as "a sequence of instructions designed for execution on a computer system." A program, computer program, or software application typically includes a subroutine, a function, a procedure, an object method, an object implementation, an executable application, an applet, a servlet, a source code, an object code, a shared library/dynamic load library and/or other sequence of instructions designed for execution on a computer system. The term "entity," as used herein, includes any individual, corporation, business, organization, or any subsidiary of or subdivision within such corporation, business, or organization.

Overview

The present invention, according to one embodiment, overcomes problems with the prior art by providing a framework for an entity to establish its optimal strategic position for each of its targets. The process provides the flexibility to customize the display prioritization based on any variable; from specific organizational targets to individualized customer strategies. The present invention provides an organization a process to maximize its strategy and establish a position where the most value is driven for the customer, the organization itself, and the company as a whole.

One of the advantages of an embodiment of the present invention is that it provides a portable, flexible solution that can be tailored to a variety of organizations and/or targets, goals and metrics. For organizations or companies frustrated with or bogged down by having a multitude of contradictory targets, the present invention provides an organization a system to develop a "big picture" outlook of all its goals in one, easy-to-use format.

An embodiment of the present invention allows an organization to evaluate the current landscape of measurements and targets that it is tasked to achieve; identify what its customers are measured to and what they value; establish where in its processes it drives its measurements and where in the processes it assists its customers in achieving theirs; and evaluate and recognize if there are areas where it can refocus its initiatives to better align with its customers and itself.

Specifically, an embodiment of the present invention provides the framework for an organization to:

prioritize targets for the specific organization;

understand the measurements and initiatives for its customer set;

map its targets to customer goals and targets to identify areas of shared initiatives as well as areas of contradictory initiatives;

further map its targets to its own targets and identify areas where it may impact (positively or negatively) its own targets;

develop a "web" diagram depicting the interrelation of various targets;

identify its customers' and its own business cycle(s) to establish where the targets (positively and negatively) are affected;

from the previous steps, determine which measurements present a hurdle to other strategic initiatives or are either mature or saturated; and develop business case(s) to address identified contradictions or proposed resource allocations.

Computer System

FIG. 1 illustrates an exemplary computer system 100 containing a presentation tool 122 with a metric prioritization application 124 according to an embodiment of the present invention. Each computer system 100 may include, inter alia, one or more computers and at least a computer readable medium 126.

The computer system 100, according to the present example, includes a controller/processor 116 which processes instructions, performs calculations, and manages the flow of information through the computer system 100. Additionally, the controller/processor 116 is communicatively coupled with program memory 110. Included within program memory 110 are a presentation tool 122 with a metric prioritization application 124 (which will be discussed later in greater detail), operating system platform 112, and glue software 114. The operating system platform 112 manages resources, such as the data stored in data memory 120, the scheduling of tasks, and processes the operation of the presentation tool 122 in the program memory 110. The operating system platform 112 also manages a graphical display interface (not shown) displayed on, for example, a monitor 102 with a visual display screen 104, a user input interface (not shown) that receives inputs from the keyboard 106 and the mouse 108, and communication network interfaces (not shown) for communicating with the network link. Additionally, the operating system platform 112 also manages many other basic tasks of the computer system 100 in a manner well known to those of ordinary skill in the art.

Glue software 114 may include drivers, stacks, and low level application programming interfaces (API's) and provides basic functional components for use by the operating system platform 112 and by compatible applications that run on the operating system platform 112 for managing communications with resources and processes in the computing system 100.

Software and Computer Program Medium

In this document, the terms "computer program medium," "computer-usable medium," "machine-readable medium" and "computer-readable medium" are used to generally refer to media such as non-volatile program memory 110, data memory 118, removable storage drive 120, a hard disk installed in hard disk drive (not shown), and signals. These computer program products are means for providing software to the computer system 100. The computer-readable medium allows the computer system 100 to read data, instructions, messages or message packets, and other computer-readable information from the computer-readable medium. The computer-readable medium, for example, may include non-volatile memory, such as Floppy, ROM, Flash memory, Disk drive memory, CD-ROM, and other permanent storage. It is useful, for example, for transporting information, such as data and computer instructions, between computer systems.

Various software embodiments are described in terms of this exemplary system. After reading this description, it will become apparent to a person of ordinary skill in the relevant art(s) how to implement the invention using other computer systems and/or computer architectures.

Displaying Prioritization of Metric Values

Figure 2:
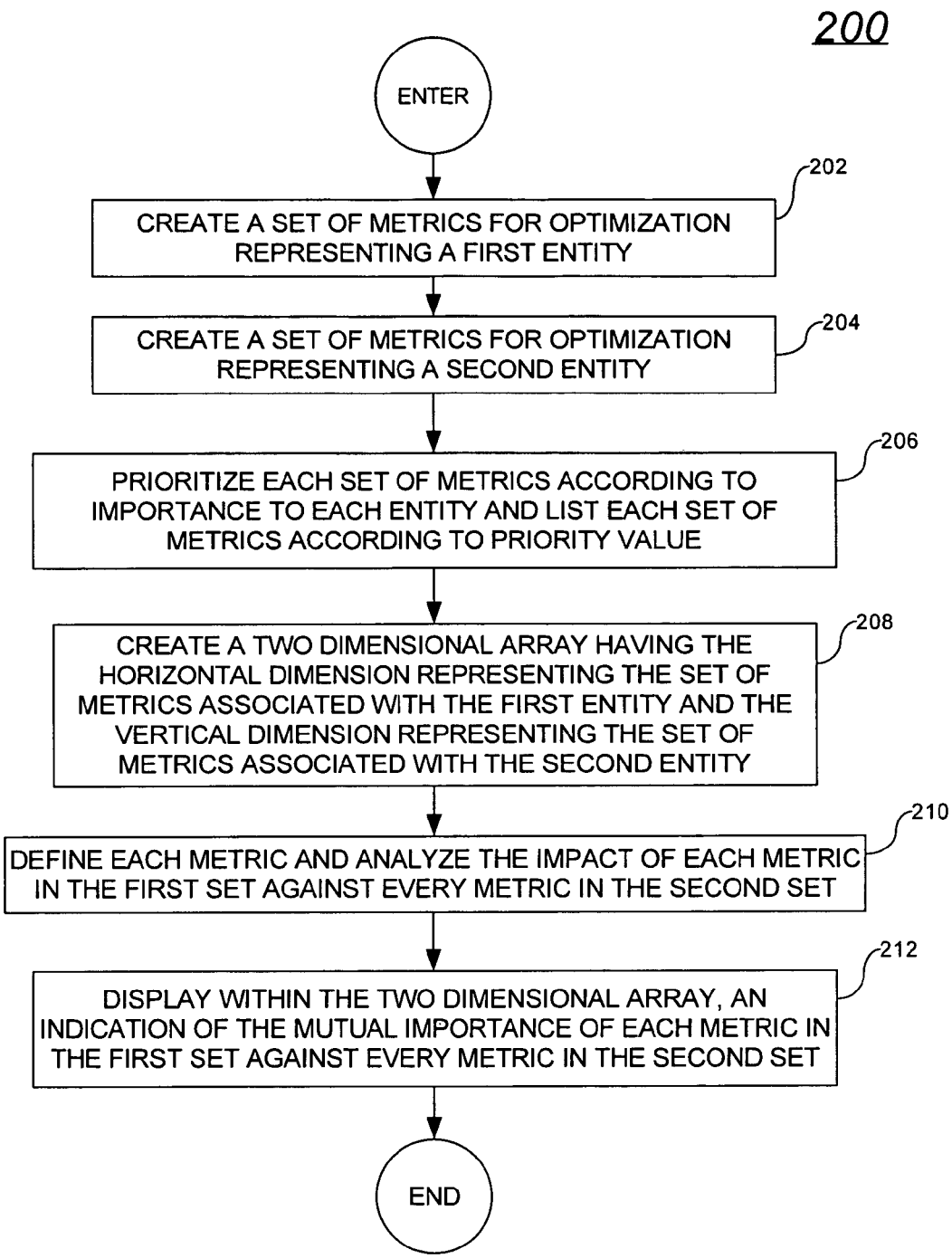
FIG. 2 is an operational flow diagram illustrating an exemplary operational sequence for the system of FIG. 1, according to a preferred embodiment of the present invention.
Figure 3:
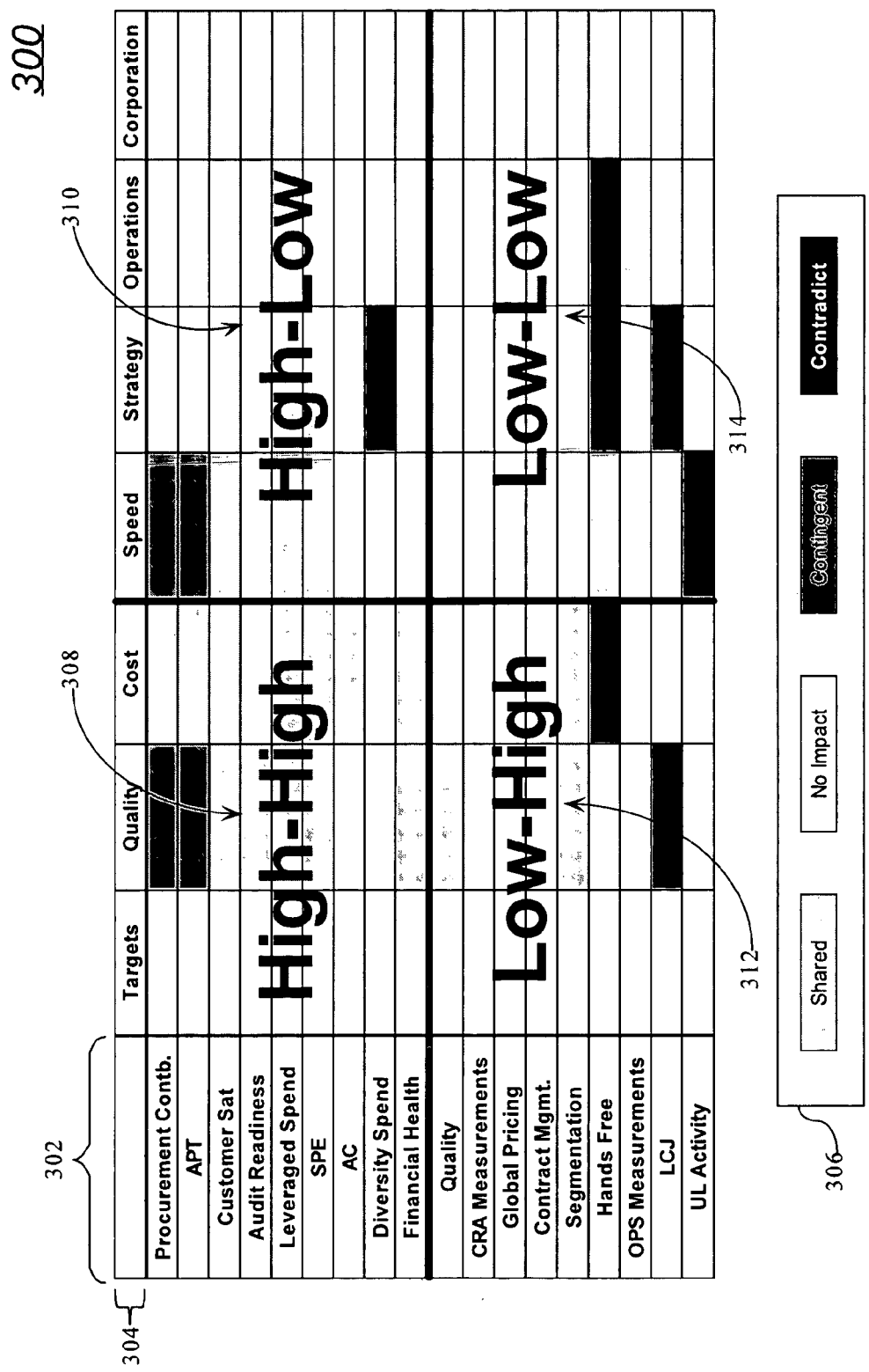
FIG. 3 is an exemplary two dimensional array presentation illustrating the results of the operational sequence of FIG. 2, comparing the metrics of importance to an organization against the metrics of importance to its customer, according to a preferred embodiment of the present invention.

An embodiment of the present invention consists of developing a strategic profiling blueprint for an organization. FIGS. 2 and 3 illustrate an exemplary operational sequence of the present invention and an example of the manner in which the results are presented. The method 200 begins, at step 202, by creating a set of metrics for optimization that represent a first entity. The entity may be a corporation or an organization within a corporation. At step 204, a second set of metrics is created for comparison to the first set. The second set of metrics may represent another organization within the corporation, a client or customer, or may even represent the same metrics or other metrics important to the first entity itself. Next, each set of metrics is prioritized according to its importance to its associated entity and listed in order of importance, at step 206. At step 208, a two dimensional array is created as a framework for analyzing the lists of metrics. The array displays the list of metrics associated with first entity along the horizontal axis and the list of metrics associated with the second entity along the vertical axis.

Referring to FIG. 3, for example, the vertical axis 302 indicates a set of parameters which an exemplary procurement organization has determined to be important to achieving its overall goals. The horizontal axis 304 identifies a set of parameters important to the organization's customers. Because each list has been prioritized according to value, the natural effect is that the data is arranged into four quadrants 308, 310, 312, 314. Values that fall within the upper left quadrant 308 have a high importance to both the procurement organization and its customers. Values in the upper right quadrant 310, while important to the organization, have a much lower importance to its customer. Likewise, values in the lower left quadrant 312 are less important to the organization while having a high value to the customer. Items that fall within the lower right quadrant 314 have the lowest priority to both the organization and its customer. It is important to note that other ordering of importance is within the true scope and spirit of the present invention, including ordering from, left-to-right, most important to least important.

Turning back to FIG. 2, at step 210, each metric is precisely defined and the impact of each metric in the first set is analyzed against every metric in the second set. The defining and analysis process is accomplished, for example, by determining a numerical value for the effect each metric has on a set of attributes, characteristics, or variables and comparing each value to the corresponding value of the metric for comparison. In an exemplary embodiment, a set of attributes includes such things as cost, time, manpower, etc. The numerical values range from 0 to 10 with "0" having the most negative impact, "5" having no impact, and "10" having the most positive impact. The difference in corresponding values for each attribute is calculated between the two metrics under comparison, and these deltas are summed to arrive at a numerical value for the impact mutual impact of these two metrics. This numerical value can then be expressed according to a legend or key 306, to be discussed further later. Finally, at step 212, an indication of the mutual importance of each metric in the first list compared to every metric in the second list is displayed within the two dimensional array.

Referring back to the example shown in FIG. 3, the metrics listed along the vertical axis 302 have the following meaning:

Procurement Contribution (PC): the total amount of dollars saved as a result of procurement's direct negotiations with a particular supplier. Procurement contribution can be specific to a single project or derived from reduced rates associated with longer-term contracts.

Average Payment Terms (APT): the length of time between when an invoice is received and when the invoice is paid.

Customer Satisfaction: a satisfaction survey through which procurement's customers (internal) rate the effectiveness of the procurement team members.

Audit Readiness: working in a manner that ensures all contracts, Purchase Orders and other transactions adhere to the company's stated business controls policies and practices.

Leveraged Spend: dollars which are spent to procure services and deliverables from identified "strategic" suppliers.

Supplier Performance Evaluation (SPE): a survey of end users which evaluates the performance of specified suppliers against identified criteria.

Absolute Competitiveness (AC): a benchmarking exercise through which the price paid by the organization for certain goods and services is compared to the price paid by competitors for similar goods and services.

Diversity Spend: dollars spent with suppliers that are at least 51% owned by people of identified multicultural backgrounds.

Low Cost Jurisdiction (LCJ): the strategy of shifting to a supply base or resource base in a lower cost region or geography (akin to "Outsourcing").

Financial Health: a way of measuring the financial stability of a supplier through a review and analysis of the supplier's financial records.

Quality: a benchmarking exercise through which the quality of goods and services delivered to the organization by its suppliers is measured and monitored to ensure all expected criteria and milestones have been met.

Controlled Risk Assessment (CRA) Measurements: auditable procurement metrics which monitor the issuance of and activities related to Purchase Orders to ensure all stated policies and procedures have been adhered to.

Global Pricing: implementing a global pricing structure, wherever possible, with a particular supplier to enable speed of service and ensure that the best pricing is available to all the organization's subsidiaries worldwide.

Contract Management: the length of time a contract or amendment is in process as well as auditing a contract file to ensure all applicable terms and conditions have been included and all required approvals have been received.

Segmentation: the process of ranking suppliers as either Strategic/Core, Emerging, Regional/Niche, Acquired, or Non-Strategic.

Hands-Free: the placing of Purchase Orders through automated processes without the manual intervention from a buyer.

Ops Measurements: diagnostic measures of the tactical efforts undertaken by the procurement area responsible for the actual placement of Purchase Orders.

Unitless (UL) Activity: a unit of measure applied to Purchase Orders which tracks the volume or type of services or deliverables expected to be received by the organization against such Purchase Order.

The key 306 at the bottom of the presentation 300 indicates the relationship between the metrics. The key can be, for example, color coded, to indicate the relationship, with each relationship having a different color. Additionally, the key may be defined as having different backgrounds, patterns, shading, or different border styles on each cell. For instance, very light shading could indicate that the metrics have a positive impact upon one another, or a shared objective (i.e. if a value associated with one of the two compared metrics changes positively, the value of the other metric also increases). "No impact," which may be indicated in white, shows that a change in one metric has no effect on the other metric. Contingent indications, meaning the effect one metric has on another may be determined by outside factors, can be shown in progressively darker shades of grey with negative effects increasing as the shading darkens. While the truly contradictory elements, the metrics which have an extreme negative or inverse effect upon one another, are shown in, for example, black. This provides an instant overview of the organization's evaluation methods with an easily discernable indication of where metrics are in opposition to one another and where improvements may be made to increase productivity. It is obviously apparent that a high volume of "black" blocks in the upper left-hand quadrant 308 (the high-high importance area), would have disastrous results on the goals each organization is trying to achieve as the most important parameters for each organization would constantly be in direct conflict with one another. It can also be seen that perhaps some lesser important goals may conflict with other more desirous metrics and indicate that these metrics may not be beneficial to track. For example, in FIG. 3, the Low Cost Jurisdiction (LCJ) parameter directly conflicts with the customer's goals of quality and strategy. Because driving this parameter may have negative consequences for the customer and it is a low priority metric for the organization itself, there is a good possibility that using this parameter to rate the organization may not be desired.

Figure 4:
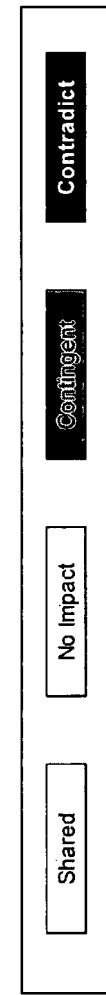
FIG. 4 is an exemplary two dimensional array presentation illustrating the results of the operational sequence of FIG. 2, comparing the metrics of importance to an organization against these same metrics, according to a preferred embodiment of the present invention.

An exemplary embodiment of the present invention may also be used to determine if the parameters an organization uses to evaluate itself are self-defeating. In other words, a positive change in the some of the factors used for evaluation naturally affect other parameters negatively, therefore the organization may never achieve its own goals completely. FIG. 4 illustrates how the above process may be used to evaluate the validity or relevance of an individual set of parameters. In this case, the same parameters are listed along both the vertical 402 and horizontal 404 axes, and each metric is analyzed in relation to every other metric within the same evaluation set.

Figure 5:
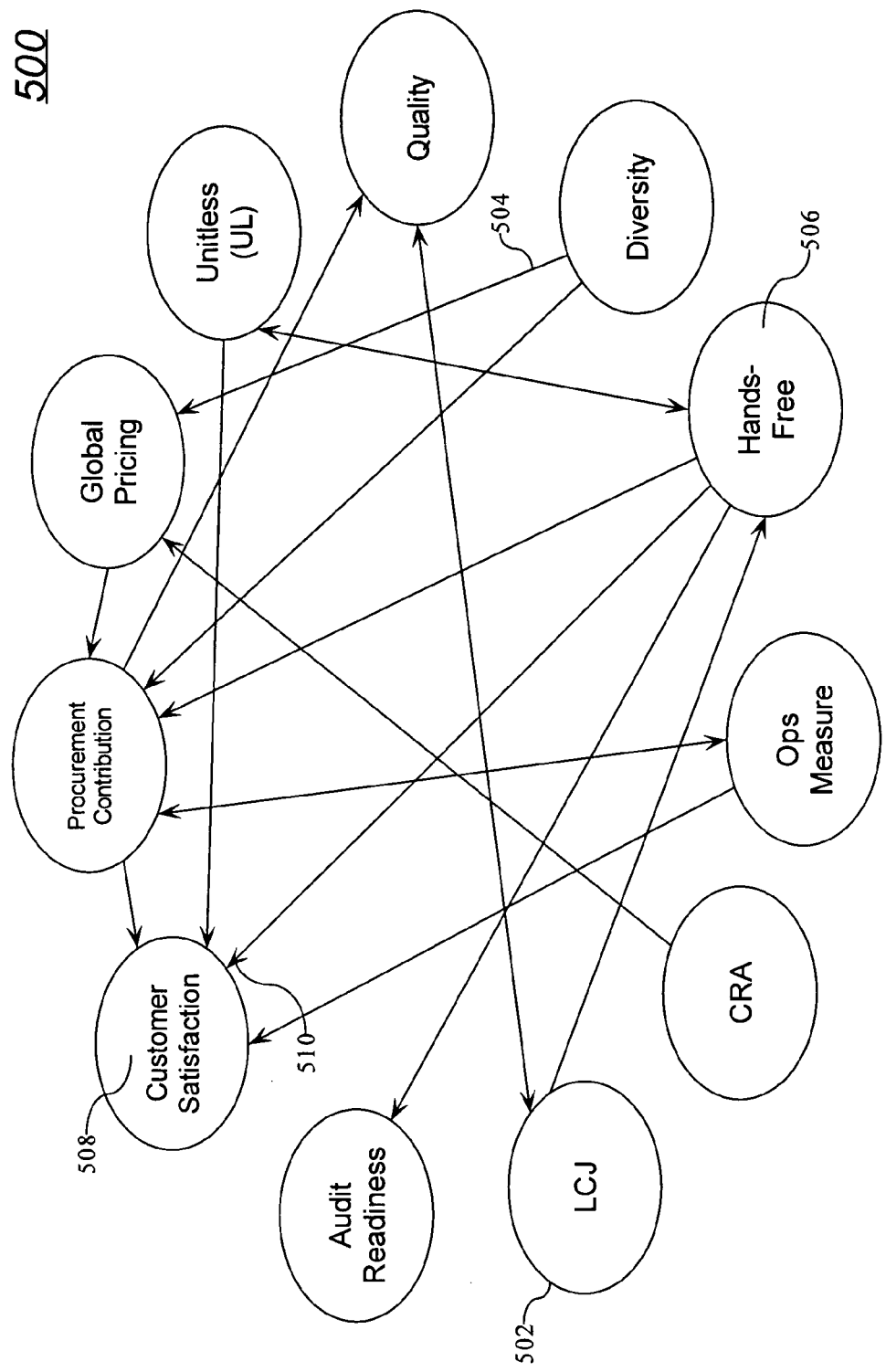
FIG. 5 is an exemplary web-diagram presentation illustrating the results of the operational sequence of FIG. 6, according to a preferred embodiment of the present invention.
Figure 6:
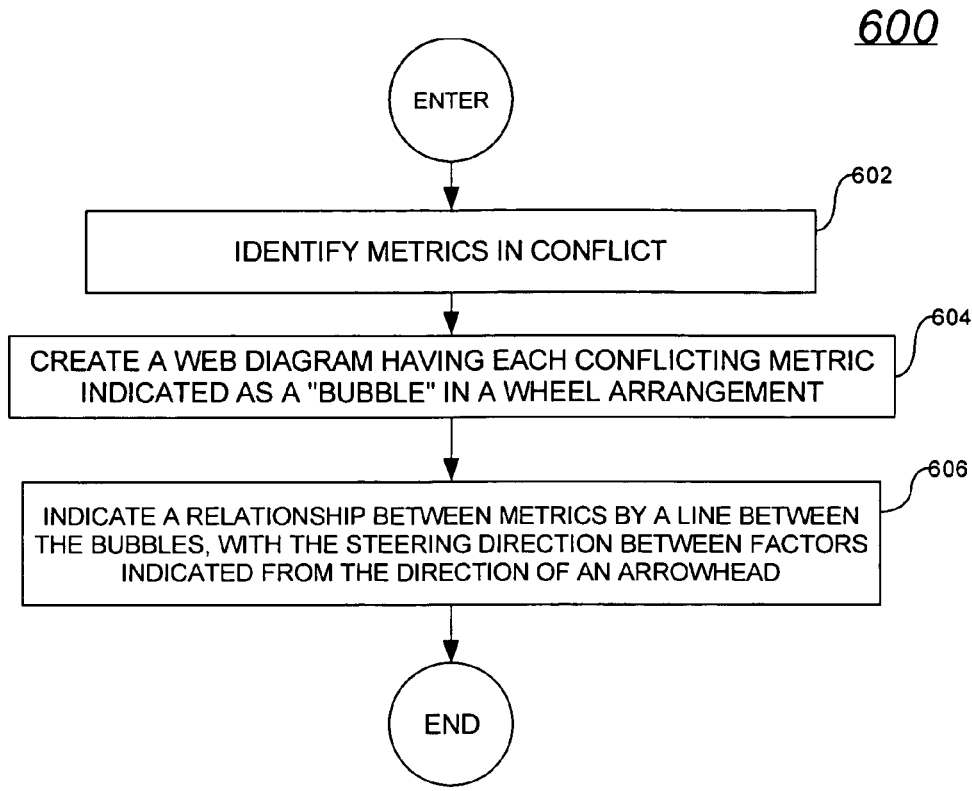
FIG. 6 is an operational flow diagram illustrating an exemplary operational sequence for the system of FIG. 1, according to a preferred embodiment of the present invention.

To further illustrate weaknesses in the organization's evaluation procedure, any conflicts that appear from the two-dimensional presentation as shown in FIG. 4, are further expressed in the web diagram of FIG. 5, using the process depicted in FIG. 6. Any metrics that are in conflict with each other are identified, at step 602, and indicated on a web diagram 500 as a bubble 502 in a wheel arrangement, at step 604. Lines 504 drawn between the bubbles, at step 606, indicate a relationship between those factors, with an arrowhead at the end of lines to illustrate a steering direction. The direction of steering is set, for example, by allocating one axis to contain the driving metric and the other axis contains the driven metric. For example, in FIG. 5, the "Hands-free" factor 506 is in conflict with the "Client Satisfaction" metric 508. However, this is a one-sided relationship. The hands-free metric 506 is an indicator of how well the organization is at implementing automation in their procurement process. But, the more automated the operation gets, the more likely that customers will be unhappy because they are unable to voice their concerns to a human. If the organization strives to make the process more hands-free, then customer satisfaction decreases. However, if the organization strives to improve customer satisfaction, this does not necessarily impact the hands-free operation at all. Therefore, conflict only arises between these two factors when the hands-free factor steers the relationship. Hence, the conflict relationship is indicated by an arrowhead 510 that only points from hand-free 506 to client satisfaction 508. The web-diagram presentation clearly and distinctly indicates conflicts within the organization's evaluation system in an easy-to-read fashion.

NON-LIMITING EXAMPLE

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

A computer system may include, inter alia, one or more computers and at least a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer system to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A computer implemented method for displaying a plurality of different metric values, the computer implemented method comprising:

executing on a processor residing on an information processing system the following:

forming a plurality of cells within a two-dimensional array having a horizontal dimension and a vertical dimension; and generating, within the plurality of cells, an indication of mutual importance for a first set of metric values associated with a first entity and a second set of metric values associated with a second entity, wherein the first set of metric values comprises a first set of attributes and represents a set of goals associated with the first entity, and where the second set of metric values comprises a second set of attributes and represents a set of goals associated with the second entity, wherein the horizontal dimension is associated with the first set of metric values and wherein the vertical dimension is associated with the second set of metric values, wherein the indication of mutual importance indicates a relationship between at least one goal of the first entity and at least one goal of the second entity, wherein a set of differences is calculated between each corresponding attribute in the first set of attributes and the second set of attributes, and wherein this set of differences is summed to arrive at a numerical value indicating the mutual importance of the first set of metric values and the second set of metric values.

2. The computer implemented method of claim 1, further comprising:

displaying the two-dimensional array with the indication of mutual importance therein.

3. The computer implemented method of claim 1, wherein the second entity and the first entity are within one business entity.

4. The computer implemented method of claim 1, wherein the second entity and the first entity represent two business entities.

5. The computer implemented method of claim 1, wherein the generating, within the plurality of cells, the indication of mutual importance for a set of metric values includes generating an indication of mutual importance selected from a fixed set of values of relative importance.

6. The computer implemented method of claim 5, wherein the fixed set of values of relative importance is indicated by one of a set of colors, a set of grey-scale tones, a set of backgrounds, a set of patterns, and a set of cell border styles.

7. The computer implemented method of claim 1, wherein the metric values represent procurement measurement analysis.

8. The computer implemented method of claim 1, further comprising:

identifying at least two metrics values in conflict;

creating a diagram wherein conflicting metrics values are arranged in a circular manner; and indicating a relationship between conflicting metric values as a line between the conflicting metric values, with a steering direction between the conflicting metric values indicated by an arrowhead.

9. A computer implemented method for generating a plurality of different metric values, the computer implemented method comprising:

executing on a processor residing on an information processing system the following:

forming a plurality of cells within a two-dimensional array having a horizontal dimension and a vertical dimension;

placing each of a first set of prioritized metrics from a first entity as a column label for each column along the horizontal dimension of the two-dimensional array, wherein the first set of prioritized metrics comprises a first set of attributes and represents a set of goals associated with the first entity;

placing each of a second set of prioritized metrics from a second entity as a row label for each row along the vertical dimension of the two-dimensional array, wherein the second set of prioritized metrics comprises a second set of attributes and represents a set of goals associated with the second entity;

calculating a set of differences between each corresponding attribute in the first set of attributes and the second set of attributes;

summing the set of differences to arrive at a numerical value indicating a mutual importance for at least a given metric associated with a given column label in the first set of metrics and for a given metric value associated with a given row label in the second set of metric values, wherein the indication of mutual importance indicates a relationship between a goal of the first entity as represented by the given metric value associated with the given column label and a goal of the second entity as represented by the given metric value associated with the given row label; and filling in the plurality of cells within the two-dimensional array with the indication of mutual importance.

10. The computer implemented method of claim 9, wherein the first set of prioritized metrics is different than the second set of prioritized metrics.

11. The computer implemented method of claim 9, wherein the first set of prioritized metrics is identical to the second set of prioritized metrics.

12. The computer implemented method of claim 9, further comprising:

displaying the two-dimensional array with the indication of mutual importance therein.

13. The computer implemented method of claim 9, wherein the second entity and the first entity are within one business entity.

14. The computer implemented method of claim 9, wherein the second entity and the first entity represent two business entities.

15. The computer implemented method of claim 9, wherein the filling in the plurality of cells within the two-dimensional array with an indication of mutual importance includes filling an indication of mutual importance selected from a fixed set of values of relative importance.

16. The computer implemented method of claim 15, wherein the fixed set of values of relative importance is indicated by one of a set of colors, a set of grey-scale tones, a set of backgrounds, a set of patterns, and a set of cell border styles.

17. The computer implemented method of claim 9, wherein the metric values represent procurement measurement analysis.

18. The computer implemented method of claim 9, further comprising:

identifying at least two metrics values in conflict;

creating a diagram wherein conflicting metrics values are arranged in a circular manner; and indicating a relationship between conflicting metric values as a line between the conflicting metric values, with a steering direction between the conflicting metric values indicated by an arrowhead.

19. A computing system for displaying a plurality of different metric values, the system comprising:

means for forming a plurality of cells within a two-dimensional array having a horizontal dimension and a vertical dimension; and means for generating, within the plurality of cells, an indication of mutual importance for a first set of metric values associated with a first entity and a second set of metric values associated with a second entity, wherein the first set of metric values comprises a first set of attributes and represents a set of goals associated with the first entity, and where the second set of metric values comprises a second set of attributes and represents a set of goals associated with the second entity, wherein the horizontal dimension is associated with the first set of metric values and wherein the vertical dimension is associated with the second set of metric values, wherein the indication of mutual importance indicates a relationship between at least one goal of the first entity and at least one goal of the second entity, wherein a set of differences is calculated between each corresponding attribute in the first set of attributes and the second set of attributes, and wherein this set of differences is summed to arrive at a numerical value indicating the mutual importance of the first set of metric values and the second set of metric values.

20. The system of claim 19, further comprising:
means for identifying at least two metrics values in conflict;
means creating a diagram wherein conflicting metrics values are arranged in a circular manner; and
means for indicating a relationship between conflicting metric values as a line between the conflicting metric values, with a steering direction between the conflicting metric values indicated by an arrowhead.

21. A computer system for generating a plurality of different metric values, the system comprising:
means for forming a plurality of cells within a two-dimensional array having a horizontal dimension and a vertical dimension;
means for placing each of a first set of prioritized metrics from a first entity as a column label for each column along the horizontal dimension of the two-dimensional array, wherein the first set of prioritized metrics comprises a first set of attributes and represents a set of goals associated with the first entity;
means placing each of a second set of prioritized metrics from a second entity as a row label for each row along the vertical dimension of the two-dimensional array, wherein the second set of prioritized metrics comprises a second set of attributes and represents a set of goals associated with the second entity;
means for calculating a set of differences between each corresponding attribute in the first set of attributes and the second set of attributes;
means for summing the set of differences to arrive at a numerical value indicating a mutual importance for at least a given metric associated with a given column label in the first set of metrics and for a given metric value associated with a given row label in the second set of metric values, wherein the indication of mutual importance indicates a relationship between a goal of the first entity as represented by the given metric value associated with the given column label and a goal of the second entity as represented by the given metric value associated with the given row label; and
means for filling in the plurality of cells within the two-dimensional array with the indication of mutual importance.

22. A computer program product for displaying a plurality of different metric values, the computer program product comprising:
a storage medium readable by a processing circuit and storing computer instructions for execution by the processing circuit for performing a method comprising:
forming a plurality of cells within a two-dimensional array having a horizontal dimension and a vertical dimension; and
generating, within the plurality of cells, an indication of mutual importance for a first set of metric values associated with a first entity and a second set of metric values associated with a second entity,
wherein the first set of metric values comprises a first set of attributes and represents a set of goals associated with the first entity, and where the second set of metric values comprises a second set of attributes and represents a set of goals associated with the second entity,
wherein the horizontal dimension is associated with the first set of metric values and wherein the vertical dimension is associated with the second set of metric values,
wherein the indication of mutual importance indicates a relationship between at least one goal of the first entity and at least one goal of the second entity, wherein a set of differences is calculated between each corresponding attribute in the first set of attributes and the second set of attributes, and wherein this set of differences is summed to arrive at a numerical value indicating the mutual importance of the first set of metric values and the second set of metric values.

23. The computer program product of claim 22, further comprising:
identifying at least two metrics values in conflict;
creating a diagram wherein conflicting metrics values are arranged in a circular manner; and
indicating a relationship between conflicting metric values as a line between the conflicting metric values, with a steering direction between the conflicting metric values indicated by an arrowhead.

24. A computer program product for generating a plurality of different metric values, the computer program product comprising:
a storage medium readable by a processing circuit and storing computer instructions for execution by the processing circuit for performing a method comprising:
forming a plurality of cells within a two-dimensional array having a horizontal dimension and a vertical dimension;
placing each of a first set of prioritized metrics from a first entity as a column label for each column along the horizontal dimension of the two-dimensional array, wherein the first set of prioritized metrics comprises a first set of attributes and represents a set of goals associated with the first entity;
placing each of a second set of prioritized metrics from a second entity as a row label for each row along the vertical dimension of the two-dimensional array, wherein the second set of prioritized metrics comprises a second set of attributes and represents a set of goals associated with the second entity;
calculating a set of differences between each corresponding attribute in the first set of attributes and the second set of attributes;
summing the set of differences to arrive at a numerical value indicating a mutual importance for at least a given metric associated with a given column label in the first set of metrics and for a given metric value associated with a given row label in the second set of metric values, wherein the indication of mutual importance indicates a relationship between a goal of the first entity as represented by the given metric value associated with the given column label and a goal of the second entity as represented by the given metric value associated with the given row label; and filling in the plurality of cells within the two-dimensional array with the indication of mutual importance.

25. The computer program product of claim 24, further comprising:

identifying at least two metrics values in conflict;

creating a diagram wherein conflicting metrics values are arranged in a circular manner; and indicating a relationship between conflicting metric values as a line between the conflicting metric values, with a steering direction between the conflicting metric values indicated by an arrowhead.

* * * * *